United States Patent [19]

Horvath

[11] 4,150,466
[45] Apr. 24, 1979

[54] METHOD OF MAKING AN IMPROVED HOSE AND TUBE COUPLING

[75] Inventor: Louis T. Horvath, Solon, Ohio

[73] Assignee: Samuel Moore and Company, Aurora, Ohio

[21] Appl. No.: 830,492

[22] Filed: Aug. 30, 1977

Related U.S. Application Data

[62] Division of Ser. No. 753,897, Dec. 23, 1976, Pat. No. 4,064,614.

[51] Int. Cl.² .............................................. B23P 17/00
[52] U.S. Cl. ........................................ 29/417; 29/432; 29/455 R; 29/508; 29/516; 285/253; 285/256; 285/382
[58] Field of Search ...................... 29/417, 432, 455 R, 29/508, 516; 285/253, 256, 282

[56] References Cited

U.S. PATENT DOCUMENTS

| | | | |
|---|---|---|---|
| 1,901,088 | 3/1933 | Dick | 29/508 |
| 2,147,356 | 2/1939 | Scholtes | 285/256 |
| 2,321,991 | 6/1943 | Butler | 29/508 |
| 2,341,003 | 2/1944 | Watson | 285/256 |
| 2,427,685 | 9/1947 | Midtlying et al. | 29/508 X |
| 2,481,001 | 9/1949 | Burckle | 285/256 X |
| 2,865,094 | 12/1958 | Press | 29/508 X |
| 3,165,338 | 1/1965 | Moss | 29/508 X |
| 3,357,432 | 12/1967 | Sparks | 285/253 X |
| 3,371,408 | 3/1968 | Charbonnet | 29/508 |
| 3,699,625 | 10/1972 | Spencer et al. | 29/508 X |

Primary Examiner—Charlie T. Moon
Attorney, Agent, or Firm—Stevens, Davis, Miller & Mosher

[57] ABSTRACT

A method of making an improved permanently attachable coupling shell for use with coupling assemblies adapted for attachment to the end of a hose or tube used for the conveyance of fluids under pressure. The method provides a novel means of providing a plurality of solid integral three-dimensional circumferentially spaced barbs on the inner wall of the shell that controllably pierce the wall of the hose or tube to which the coupling assembly is attached and thereby increases the resistance to detachment of the assembly under pressurized and/or axially strain conditions. Included in the method, is a means of reducing or preventing bulging of the uncompressed outer surface or wall portion of the hose or tube adjacent the compressed portion thereof within the attached shell member.

14 Claims, 10 Drawing Figures

METHOD OF MAKING AN IMPROVED HOSE AND TUBE COUPLING

This application is a division of application Ser. No. 753,897 filed Dec. 23, 1976, now U.S. Pat. No. 4,064,614 granted Dec. 27, 1977.

The invention relates generally to a method of making an improved coupling member to be attached on the end of a hose or tube used in the conveyance of fluids under pressure and more particularly to a method of making a permanently attachable coupling shell having solid, substantially symmetrical, three-dimensional barbs on its inner wall. Coupling shells having such three-dimensional protuberances or barbs are described in U.S. patent application Ser. No. 753,896 of Edward M. Kavick, filed simultaneously herewith.

BACKGROUND OF THE INVENTION

Coupling members adapted for attachment to the end of hose and tubing for use in the transfer of fluids under pressure from one point to another are well known in the prior art. It is essential that the coupling member be installed on the end of the hose or tube so securely that it will not become detached in service even when the hose or tube is conducting fluids at high pressures, high temperatures and/or subjected to repetitive pressure of flexing cycles or axial strain conditions. The usual practice for attaching the coupling member to the end of the hose or tube has been to provide a fitting having a nipple or stem portion adapted to be inserted into the bore of the hose or tube and a substantially cylindrical shell adapted to surround the sheath of the hose or the outer surface of the tubing. After the coupling member has been installed loosely on the end of the hose it is placed in a swaging or crimping apparatus which reduces the diameter of the shell and compresses the hose wall between the nipple and the shell.

The heretofore available hose and tubing coupling member assemblies have not been entirely satisfactory for operating at high fluid pressures, high temperatures and/or subjected to repetitive pressure or flexing cycles or axial strain conditions. It has been proposed heretofore to provide an insert member between the shell and the hose or tube to fasten more securely the coupling member to the end of the hose or tubing. For example, the hose disclosed in U.S. Pat. No. 3,457,359 issued July 22, 1969 is provided with a flat element having one or more sharp prongs embedded in the wall of the hose. Also, in accordance with the disclosure in U.S. Pat. No. 2,314,000, a segmented insert member having barbs is provided between the nipple and the shell. The insert member has one end disposed against ridges on the nipple and the barbed members are disposed on the external surface of the hose with their barbs embedded in the hose wall. A hose having a somewhat similar insert member underlying the shell of the coupling member is disclosed in Swiss Pat. No. 101,231 published Sept. 15, 1923. Still other types of barbed insert members installed between the external surface of the hose and the shell of the coupling member have been proposed but they all have the same disadvantage of requiring the manufacture and assembly of an additional part for the coupling and they all present a problem of fastening the shell about the slick surfaced insert member so securely that the coupling is not blown from the end of the hose when the hose is operating under high pressure. The above noted reference provide for the additional insert member to be disposed between the outer surface of the hose and the inner surface of a compressable or clamping member. An example of a coupling member having a segmented clamp-on type outer member having conical projections on the inner surface thereof is disclosed in U.S. Pat. No. 3,357,432 issued Dec. 12, 1967. A coupling member having a segmented clamp-on type outer member having annular ridges on the inner surface thereof and adapted to be attached to a hose by use of wedges is disclosed in U.S. Pat. No. 3,181,900 issued May 4, 1965. A further example of a coupling member having an outer shell having annular rings on the inner surface thereof is disclosed in U.S. Pat. No. 2,341,003 and coupling members whose outer shells have spaced holes therein so that the hose sheath might project therethrough upon compressing the shell are disclosed in U.S. Pat. Nos. 2,978,263 issued Apr. 4, 1961 and 2,810,594 issued Oct. 22, 1957.

The above referenced one-piece outer shell or compressable members have the disadvantage of having a complex segmented design requiring complicated and costly fabrication and do not provide for circumferentially spaced solid integral three-dimensional barbs on the inner wall of the outer shell or compressable member nor do they provide for a novel method of making an improved one-piece shell or compressable member for use in permanently attachable hose and tube coupling members hereinafter described.

SUMMARY OF THE INVENTION

It is an object of this invention to provide a method of making an improved coupling member for use on the end of a hose or tube used for the conveyance of fluids under pressure. It is another object of this invention to provide a method of making an improved hose and tube coupling member adapted to be used at high pressures and/or axial strain without separation of the coupling member from the hose or tube. It is yet another object of this invention to provide a method of making a hose and tube coupling member having an improved structure for securing the coupling member to the end of the hose or tube. A more specific object of this invention is to provide a method of making an improved shell for use with a hose and tubing coupling member. It is still a further object of this invention to provide a method of making an improved permanently attachable shell adapted for use with a hose or tube coupling member and having circumferentially spaced solid three-dimensional barbs on the inner wall thereof.

BRIEF DESCRIPTION OF THE DRAWINGS

Other objects will become apparent from the following description with reference to the accompanying drawing in which.

DESCRIPTION OF THE PREFERRED EMBODIMENTS

Figure 1:
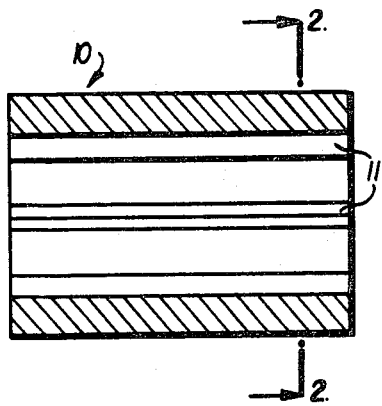
FIG. 1 is a longitudinal section of a length of an extruded tube adapted to be fabricated into the shell of the coupling member provided by the invention.

The foregoing objects and others are accomplished in accordance with this invention generally speaking by providing a method of making a shell member having circumferentially spaced solid, substantially symmetrical, three-dimensional barbs on the inner wall thereof. The barbs preferably have a substantially pointed apex facing inwardly towards the central longitudinal axis of the shell and are of sufficient depth to controllably extend through the sheath of a hydraulic hose and become embedded between strands of a reinforcing material disposed about the core tube of the hose or controllably penetrate the wall of a tube upon which it is attached. In a preferred embodiment of the invention, the shell of the coupling member is provided with a means for relieving compression of the hose or tube near one end thereof to avoid bulging of the wall or outer surface of the hose or tube that may result because of the adjacent relationship between compressed and uncompressed hose or tube wall portions. The means for relieving compression preferably includes one or more annular grooves in the internal wall of the shell disposed between the barbs and the end of the shell opposite to the end of the shell that is to be secured to the body portion of the coupling member. Another preferred embodiment of the invention is where the compression relief means further includes a relieved portion disposed in the inner wall of the shell between the annular grooves and the end of the shell opposite to the end to be secured to the body portion of the coupling member. This relieved portion preferably provides for the internal diameter of the wall of the shell being larger at the relieved portion that the internal diameter of the inner wall in the region of the barbs.

Referring now to the drawings, a preferred embodiment of the shell of the coupling member of the invention is illustrated in various states of its fabrication and installed on the end of a hose.

Figure 2:
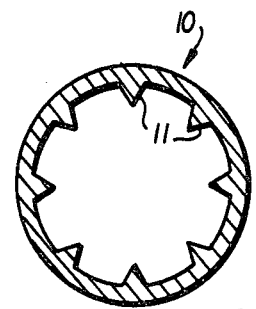
FIG. 2 is a cross-section along line II—II of FIG. 1.

FIGS. 1 and 2 respectively show a longitudinal section and cross-sectional view of elongate member 10 having a wall 13 and having circumferentially spaced longitudinally extending ribs 11 on the inner wall thereof with apex 30 facing inwardly towards the central longitudinal axis of elongate member 10.

Although longitudinal ribs 11 may be formed on the inner wall 13 of elongate member 10 such as, for example, by broaching, forging, casting, molding, or the like, it is preferred that ribs 11 be formed during the process of extruding an elongate tubular member 10. Although elongate member 10 is shown in the drawings as having a preferred tubular or cylindrical outer surface, it is to be understood that the outer surface thereof may be of any shape prior or during the process of making the shell, provided that the shape, if not already, is formed into a substantially cylindrical shape prior to attachment of the coupling member to the end of the hose or tube to be coupled. FIG. 1 also shows ribs 11 as axially aligned and in parallel relationship with wall 13 of elongate member 10. Although such parallel alignment is preferred, it is to be understood that ribs 11 may also be, for example, spirally formed such as caused, for example, by rotation of the elongate member or the rib forming mandrel during the extrusion process; design of the mold in the casting or molding process; rotation of the elongate member or tool during a broaching process, or the like. Although it is preferred that ribs 11 be triangularly shaped as shown in FIG. 2, it is to be understood, however, that the cross-sectional shape of ribs 11 may be of any shape suitable for the purpose of providing barbs capable of penetrating the hose or tube as hereinbefore described. Ribs 11 extend inwardly towards the central longitudinal axis of elongate member 10 and end in an apex 30 thereof preferably having a cross-sectional dimension, taken substantially normal to the longitudinally extending axis of ribs 11, smaller than the cross-sectional dimension of the rib base integral with wall 13, taken in the same cross-sectional plane such as, for example, the pointed apex 30 of triangular shaped ribs 11 shown in FIG. 2. It is to be understood, that although it is preferred that all of the ribs 11 of elongate member 10 be of substantially the same shape, the array of ribs 11 may be of different shape among the rib members such as, for example, some having a substantially triangular shape and others having an eliptical shape. It is to be further understood that the array of ribs 11 having different shapes may provide barbs 12, shown in FIGS. 6, 7, 8, 9 and 10 of different shape and that all barbs 12 of the invention do not necessarily have to have, for example, a substantially pyramidal shape or conical shape provided they have an apex suitable for penetrating the hose or tube to which they are compressably attached. The depth X of rib 11, shown in FIG. 2, may be of any ratio of thickness Y of tube wall 13 suitable for providing sufficient penetration of barbs formed from ribs 11 into the wall of the hose or tube to which it is to be attached. Thickness Y, shown in FIG. 2, is generally believed to be dependent upon the material used to make elongate member 10; the size or outer diameter of elongate member 10; the dimensional changes occurring during the process of fabricating the finished shell; securing the shell to the coupling body member; compression of the shell during attachment of the coupling member to the hose or tube; and use of the hose or tubing to which the coupling member is attached. The eight (8) ribs shown in FIG. 2 is for illustration purposes only. As with depth X, hereinbefore described, the number of ribs chosen is believed to be dependent upon the general size of elongate member 10 selected and the pressure to which the hose or tube coupling member may be exposed. Although one or more ribs 11 may be suitable, it is generally preferred to provide a plurality thereof. Elongate member 10 may be made of any material suitable for meeting the particular fabrication and application requirements. Elongate member 10 may be made from a metallic material such as, for example, aluminum, aluminum alloy, brass, copper, steel or the like. Elongate member 10 may also be made from a suitable polymeric or filled polymeric material such as, for example, nylon, polycarbonate, polyester, polyurethane or the like. It is preferred to extrude a tubular elongate member 10 from an aluminum material such as, for example, an aluminum alloy suitable for the fabrication, attachment and use requirements hereinbefore described.

Figure 3:
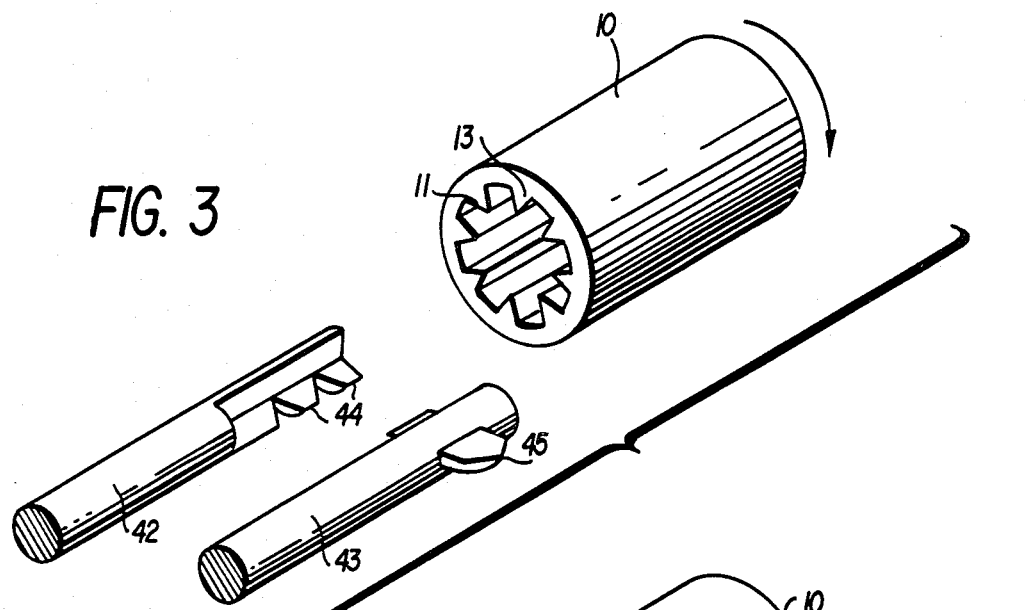
FIG. 3 is a generally perspective, exploded, partially fragmentary view illustrating one of the methods of forming barbs on the inner wall of the shell of the coupling member provided by the invention.

FIG. 3 shows a preferred method of forming barbs from the longitudinally extending circumferentially spaced ribs 11 disposed on the inner wall 13 of elongate member 10 shown in FIGS. 1 and 2. Two alternative types of forming tools 42 and 43 are shown as examples of forming tools that can be used to form the barbs on the inner wall of elongate member 10 to provide the shell of the coupling member of the invention. The tool may, for example, be of the type shown as tool 42 which has a plurality of spaced teeth 44 that when inserted into elongate member 10 and brought into rotational contact with ribs 11 would remove a portion thereof to produce the barbs. The cutting edge of tool 42 may also be provided with teeth to simultaneous form first portion 32 and/or second portion 34 in the inner wall of elongate member 10. Alternately a forming tool such as 43, having a cutting tooth 45, may be inserted into elongate member and brought into rotational contact with ribs 11 to remove a portion thereof to produce the barbs on the inner wall of elongate member 10 and may also be used to form first portion 32 and/or second portion 34 on the inner wall thereof. It is to be understood that the forming tools shown in FIG. 3 are for illustrative purpose only and that variations may occur. It is also to be understood that rotational contact may be accomplished by suitably rotating the forming tool within stationary elongate member 10; suitably rotating elongate member 10 while holding the forming tool stationary; or suitably rotating both the forming tool and elongate member 10.

Figure 5:
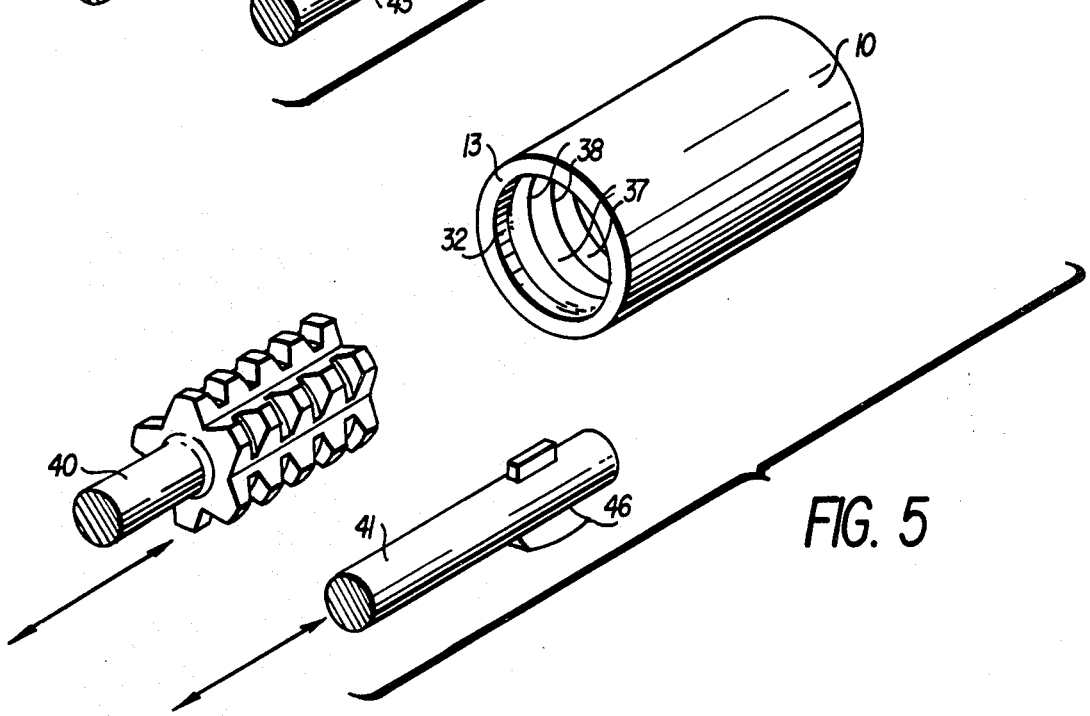
FIG. 5 is a generally perspective, exploded, partially fragmentary view illustrating another method of forming barbs on the inner wall of the shell of the coupling member provided by the invention.
Figure 4:
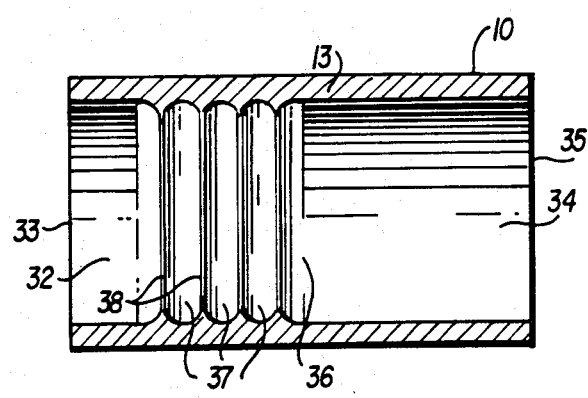
FIG. 4 illustrates another method of making the shell of the invention wherein the longitudinal section of an elongate member shows grooves in the inner wall of the elongate member prior to fabrication of the barbs on the inner wall thereof.

FIG. 4 shows an alternative method of making the barbs wherein a shaped forming tool has been inserted into elongate member 10 to form by rotational means a plurality of axially spaced annular grooves 37 in the inner surface of wall 13 of intermediate portion 36. Annular shoulders 38 axially disposed between grooves 37 have a base thereof integral with the inner wall of intermediate portion 36 and extend inwardly towards the central longitudinal axis of elongate member 10 and end in an axis having a cross-sectional dimension measured in a plane taken substantially normal to the annular shoulders 38 smaller than the cross-sectional dimension of the shoulder base measured in the same normal plane. As in the example shown in FIG. 6, first portion 32 extends from one end of intermediate portion 36 to a first end 33 thereof and second portion 34 extends from the end of intermediate portion 36 opposite to the first portion 32 to a second end 35. To produce barbs of the invention, a tool such as, for example, a broach as shown in FIG. 5, is inserted into elongate member 10 having annular shoulders 38 to remove a portion thereof so as to provide a plurality of solid, substantially symmetrical, three-dimensional circumferentially spaced barbs on the inner wall of intermediate portion 36 having a base integral therewith and ending in a substantially pointed apex. Although the inner diameter of annular shoulders 38 is shown in FIG. 4 as preferably smaller than the inner diameter of first portion 32 and/or second portion 34, it is to be understood that the inner diameter of shoulders 38 may be substantially the same as the inner diameter of first portion 32 and/or second portion 34 when design requirements permit. It is also to be understood that although annular grooves 37 are shown in FIG. 4 as being substantially normal to the central longitudinal axis of elongate member 10, that such grooves may be, when preferred, spirally formed in the inner wall of intermediate portion 36 whereby the annular axis of the grooves would be inclined at some angle other than normal to the central longitudinal axis of elongate member 10.

FIG. 5 illustrates a method of forming barbs on the inner wall of elongate member 10 shown in FIG. 4. Illustrated in FIG. 5 are examples of forming tools such as broaches 40 and 41 that may be inserted into elongate member 10 and by relative axial movement therewith to remove a portion of annular shoulders 38 disposed on the inner wall 13 of elongate member 10 to form the barbs. The forming tool may have a plurality of circumferentially spaced teeth such as, for example, tool 40 shown in FIG. 5, to simultaneously form all of the barbs accorded by the teeth of the tool. The tool may have only one cutting tooth such as tooth 46 of tool 41 shown in FIG. 5. A forming tool having less teeth than the number of barbs intended to be fabricated on the inner wall of the elongate member, would require rotational indexing in addition to relative axial movement between the tool and the elongate member to form all of the barbs desired. It is to be understood that the tools 40 and 41 shown in FIG. 5 are for illustrative purpose only and that variations may occur. It is also to be understood that the forming tools used to fabricate the barbs from annular shoulders 38 do not necessarily have to cut away the annular shoulders 37 to a point where the tool reaches the outer diameter of grooves 37 disposed between annular shoulders 38 and that a portion of grooves 37 may remain between the barbs formed where suitable.

Figure 6:
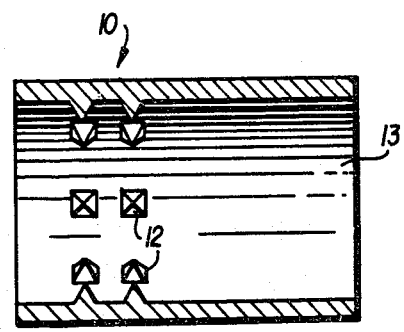
FIG. 6 illustrates the tube of FIGS. 1 or 4 after a forming operation to complete the fabrication of a barb on the inner wall.

FIG. 6 shows wherein a suitable length of member 10 shown in FIGS. 1 or 4 has been internally machined to form the pyramidal barbs 12 shown. The barbs are disposed on the inner wall of the intermediate portion 36 of elongate member 10. A first portion 32 extends axially from the intermediate portion to a first end 33 thereof and second portion 34 extends axially opposite from the other end of intermediate portion 36 to a second end 35 thereof as previously described herein, the formation of barbs 12 may be accomplished, for example, by rotating elongate member 10 and/or a forming tool inserted therein to remove a portion of ribs 11. Although the shape of barbs 12 is preferably pyramidal as shown, it is to be understood that the portion of ribs 11 removed by the forming tool may be of any shape such as, for example, elliptical or other shape suitable for providing barbs 12 with a substantially symmetrical form such as, for example, pyramidal, conical or the like, for suitably penetrating the hose or tube upon which the shell made from elongate member 10 is attached. Although it is preferred that all faces of barb 11 be substantially triangular in shape, so as to provide pyramidal shaped barbs 12, the faces of barb 12 produced by the shape of the forming tool may be different than the faces of barb 12 produced, for example, as a result of the extrusion of a tubular elongate member 10 having ribs 11 on the inner wall thereof or resulting from subsequent machining or forming that might be done. Although only two rows of barbs 12 are shown in FIG. 3, it is to be understood that such is for illustrative purposes only and that, as in the case of selecting the number of ribs hereinbefore described, the choice of number of rows is dependent upon the particular use requirements contemplated. It is to be further understood that removal of one or more barbs for the purpose of altering the array of barbs within the shell is considered within the scope of the invention and that although it is preferred that the array of barbs 12 shown, for example, in FIGS. 6, 8, 9 and 10 be symmetrical as to the number of barbs per row, that, dependent upon design requirements, barbs 12 may be staggered such as, for example, by omitting some of the barbs in the mold used in forming the barbs during a molding or casting process or, as hereinbefore recited, removing one or more of the barbs during a machining process.

Figure 7:
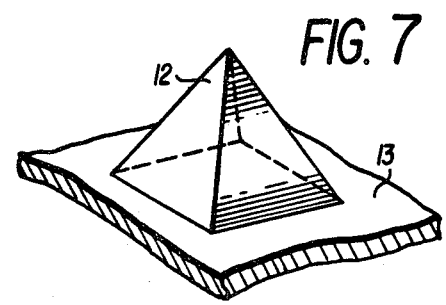
FIG. 7 is an enlargement view of an embodiment of one of the barbs on the inner wall of the tube illustrated in FIG. 6.

FIG. 7 illustrates a detailed view of preferred, substantially symmetrical, pyramidal shaped barb 12 having an appex 31 disposed at the end of barb 12 closest to the central longitudinal axis of elongate member 10. Although apex 31 may be sharp, it is preferred that apex 31 be pointed and more preferably that it be slightly rounded yet sufficiently pointed so as to suitably penetrate the wall of the hose or tube upon which it is to be used as hereinbefore described. FIG. 7 also illustrates the three-dimensional nature of barb 12 and its being integral with inner wall 13 at the end thereof opposite to apex 31 and that the cross-sectional dimension of the apex is smaller than the cross-sectional dimension of the integral base of the barb. Although apex 31 may be the same shape as apex 30 shown in FIG. 2, it may also be a different shape therefrom as the result, for example, of the barb forming operations hereinbefore described.

Figure 8:
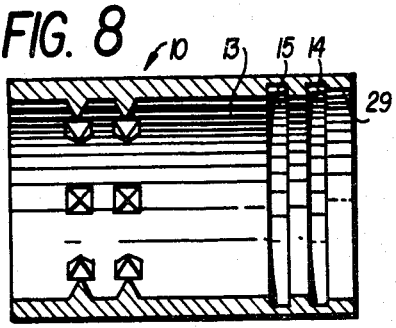
FIG. 8 illustrates the tubular member of FIG. 6 after a forming operation additional to the operation providing the barbs of FIG. 6.
Figure 9:
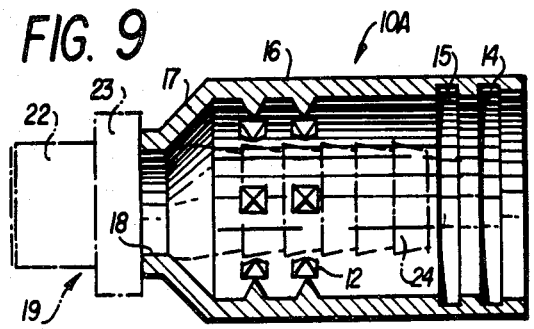
FIG. 9 illustrates the assembly of the shell member of FIG. 8 with the stem or nipple portion and body portion of one embodiment of the coupling member of the invention.
Figure 10:
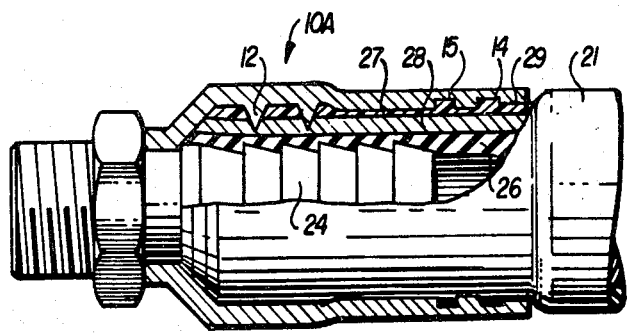
FIG. 10 illustrates the coupling member of FIG. 9 installed on the end of a hydraulic hose.

FIG. 8 shows elongate member 10 of FIG. 6 having compression relief means in the inner wall of second portion 34 disposed intermediate barbs 12 and second end 35. First end 33 is opposite to second end 35 of elongate member 10 and is the end thereof to be secured to the coupling body member shown in FIGS. 9 and 10. Shown in FIGS. 8, 9, and 10 are annular grooves 14 and 15 in inner wall 13 of elongate member 10 disposed between barbs 12 and second end 35 of elongate member 10. Also shown in FIGS. 8, 9, and 10 is relieved portion 29 in inner wall 13 disposed between annular grooves 14, 15 and second end 35 of elongate member 10. Although the figure illustrates a preferred embodiment of compression relief means disposed between barbs 12 and second end 35 of elongate member 10, the compression relief means may comprise one or more such annular rings of any suitable cross-sectional form without having a relieved portion, such as relieved portion 29, or it may be comprised entirely of a relieved portion such as relieved portion 29 and may be parallel to inner wall 13 as shown in FIG. 6 or may be tapered such that the starting edge of relieved portion disposed closest to barbs 12 or annular grooves 14, as the case may be, is of a smaller internal diameter than the inner diameter taken at second end 35. Another example of compression relief means, not shown in the figures, is where the inner wall 13 of elongate member 10 disposed between barbs 12 and second end 35 may be provided with a wavey or undulated inner surface for a portion or the entire length of the wall thereof. Although it is not required to provide compression relief means disposed between barbs 12 and second end 35, it is preferred as a means of minimizing or avoiding bulging of the hose or tube wall (or portion thereof) at or adjacent to second end 35 of a compressed shell made from elongate member 10. As in the case or barbs 12, hereinbefore described, the relief means may be formed by a machining operation prior, during or subsequent to the formation of barbs 12 or may be formed by design of the mold in a molding or casting operation if such is the case. The outer diameter of annular grooves 14 and 15 is necessarily larger than the inner diameter of elongate member wall 13 yet sufficiently smaller than the outer diameter of elongate member 10 so as not to adversely affect the integrity of wall 13 in the region thereof around or near grooves 14 and 15.

FIG. 9 illustrates the formation of shell 10A from elongate member 10 shown in FIG. 8 and joined with coupling body member 19 as a preferred embodiment of the invention. The tube is formed into a shell 10A having a substantially cylindrical intermediate portion 36, a frusto-conical first portion 17 formed from first portion 32, shown in FIGS. 6 and 8, and extending from intermediate portion 36 to first end 33. First end 33 of frusto-conically shaped portion 17 is secured to body member 19 such as, for example, by crimping or swaging first end 33 into internal annular groove 18 in nipple 24 to secure shell 10A thereto. In assemblying the coupling member, pintle member 24 is inserted into elongated member 10 from first end 33 thereof such that elongate member 10 is disposed concentrically about nipple 24 and first end 33 is axially aligned radially outwardly from groove 18. The resulting coupling member has a tubular body member 19 provided with a coupling attachment means end such as, for example, externally threaded end portion 22, a nipple 24 extending therefrom, and an external annular member 23 disposed intermediate the attachment means and nipple 24. External annular member 23 may be of any suitable shape. Preferably, annular member 23 is provided with a shape suitable for gripping in order to rotate or stabilize coupling member 19 during an attachment process. Although FIGS. 9 and 10 show groove 18 cut into nipple 24 as a means of securing shell 10A to body member 19, it is to be understood that any suitable means of securement may be employed such as, for example, a groove in an annular shoulder portion on the side thereof of annular member 23 facing nipple 24 or on the outer surface of annular member 23, depending upon design preference. Frusto-conical portion 17 may be formed prior or during the process of securing first end 33 thereof to body member 19. In the event that frusto-conical portion 17 is formed prior to assembly with coupling member 19, it is required that first end 33 have an internal diameter large enough to clear the largest diameter associated with pintle 24 during the assembly process. Frusto-conical portion 17 may, for example, be included in the mold design for molded or cast embodiments of the invention. As in the method of forming frusto-conical portion 17 during the process of securing shell 10A to body member 19, a preformed conical portion 17, as provided above, is secured to body member 19 such as, for example, by crimping or swaging the end in a groove 18 as hereinbefore described. Although body member 19 may be made of a suitable polymeric or filled polymeric material such as, for example, nylon, polyurethane, polycarbonate polyester or the like, it is preferred that body member 19 be made of a metallic material such as, for example, steel, brass, stainless steel, aluminum, aluminum alloys or the like materials. although the coupling member may comprise a shell 10A made of a polymeric or a metallic material secured to a body member 19 made of a metallic material or a polymeric material, it is preferred that both shell 10A and body member 19 be made of metallic materials such as, for example, shell A being made from a suitable aluminum alloy and body member 19 being made from a suitable steel. In the case where shell 10A is made from a polymeric material, the forming of frusto-conical portion 17 and securing first end 33 thereof to body member 19 may be accomplished by suitable heat forming techniques. The use of suitable adhesives to enhance securement of shell 10A to coupling member 19 may also be utilized where desired.

A hydraulic hose 21 secured to the coupling member is illustrated in FIG. 10. The end of hose 21 is inserted loosely in the coupling member with nipple 24 disposed in the bore of the core tube 26 of hose 21. The assembly of hose 21 and coupling member 19 is placed in a suitable compressing or forming apparatus such as, for example, swaging, crimping or heat forming apparatus, dependent upon the material selected for shell 10A, and shell 10A is reduced in cross-section to force barbs 12 through the sheath 27 of hose 21 until the apex thereof are embedded in the reinforcing layer 28. As shell 10A is compressed about the hose end 21, sheath 27 flows into grooves 14 and 15 and against relieved inner wall 29.

The coupling member provided by the invention may be secured to the end of any suitable hydraulic hose or tube having a wall thereof capable of being penetrated by barb 12 of shell 10A. Penetration ability of the barbs is dependent upon the material selected to make the shell 10A and the shape of the barb. Generally, shells 10A of the invention made from metallic materials will penetrate most hoses having rubber or polymeric sheaths or core tubes and fibrous and/or metallic strand-like reinforcement. In the case of shell 10A being made of a polymeric material, it may be required that the hardness of the polymeric material used to make shell 10A be greater than the hardness of the material used to make the wall of the hose or tube to which it is to be attached.

Examples of hoses for which the coupling member of the invention is particularly advantageous are described in, for example, U.S. Pat. Nos. 3,062,241; 3,116,760; 3,604,461; 3,722,550 and 3,905,398, the disclosures of which are incorporated herein by reference.

The coupling member may have any suitable end attachment means for connecting it to another coupling or fitting member such as, for example, female or male threads (hereinbefore described) or a snap-lock arrangement. The novel shell may, for example, be combined with the body and nipple of the coupling member disclosed in U.S. Pat. No. 3,165,338. The coupling member may be fastened to the end of the hose or tube, where suitable, with apparatus such as, for example, disclosed in U.S. Pat. Nos. 3,058,212; 3,706,212; 3,706,123; 3,849,858; 3,785,050 and 3,858,298.

Best results are obtained particularly in high pressure hose assemblies if the barbs are solid, substantially symmetrical, three-dimensional protuberances such as conical or pyramidal shaped protuberances. The barbs must have a substantially pointed apex for penetration of the fibrous layer, without substantial cutting thereof. While a triangularly shaped protuberance may be used in some hose assemblies, the three-dimensional barbs such as conical or pyramidal shaped barbs are stronger than a triangular shaped one and are preferred. By three "dimensional barbs" as used herein is meant protuberances having a base which has substantial dimensions both longitudinally and circumferentially as distinguished from triangularly shaped barbs pierced from the shell which extend longitudinally in thickness only a distance equal to the thickness of the shell. Preferably, the "three-dimensional barbs" have rectangular bases or circular bases and tapers gradually to a pointed apex. The bases of the barbs are not necessarily symmetrical but they are preferably substantially symmetrical.

Although the invention has been described in detail for the purpose of illustration, it is to be understood that such detail is solely for that purpose and that variations can be made therein by those skilled in the art without departing from the spirit and scope of the invention except as it may be limited by the claims.

I claim:

1. In a method of making an improved permanently attachable coupling member for the end of a hose or tube for use in conveyance of fluids under pressure, said coupling member comprising a body member comprised of a coupling attachment means end, a nipple extending from said attachment means end, an external annular protruding member and external recessed securement means disposed intermediate said attachment means end and said nipple, a shell member disposed concentrically about the nipple and secured at one end thereof to the body member, the method including the steps of:
    (a) molding or casting a plurality of solid substantially symmetrical, three-dimensional circumferentially spaced barbs on the inner wall of an elongate member having a central longitudinal axis therethrough, said barbs having a base thereof integral with the inner wall of the elongate member and extending radially inwardly from the base towards the central longitudinal axis of the elongate member and ending in a substantially pointed apex;
    (b) providing a length of the elongate member suitable for use as a shell for the coupling member;
    (c) forming said first portion of the elongate member into a substantially frusto-conical shape terminating at the first end of the elongate member;
    (d) inserting said coupling member nipple into the elongate member from the first end thereof so that the elongate member is disposed concentrically about the nipple and said first end is axially aligned radially outwardly from the coupling body member securement means; and
    (e) compressing said first end into the coupling body member securement means to provide a shell in secured relationship therewith.

2. The method of claim 1 including the step of forming compression relief means in the inner wall of the elongate member second portion disposed intermediate said barbs and said second end.

3. The method of claim 1 wherein the frusto-conical shape of step (c) is formed by casting or molding during step (a).

4. The method of claim 2 wherein the compression relief means is formed during the casting or molding step (a) of claim 1.

5. The method of claim 2 wherein the said compression relief means comprises forming one or more axially spaced annular grooves in the inner wall of the second portion.

6. The method of claim 2 wherein the said relief means comprises forming a relieved inner wall in the second portion intermediate said barbs and said second end having an internal diameter greater than the internal diameter of the inner wall of the intermediate portion.

7. The method of claim 5 including the step of forming a relieved inner wall in the second portion intermediate said annular grooves and said second end having an internal diameter greater than the internal diameter of the inner wall of the intermediate portion.

8. The method of claim 1 wherein the length of the elongate member suitable for use as the shell of the coupling member is provided by cutting the elongate member to the desired length.

9. The method of claim 1 wherein the elongate member is formed by casting or molding a metallic or polymeric material suitable for use as a shell of the coupling member.

10. The method of claim 1 wherein the elongate member has a substantially cylindrical outer surface.

11. The method of claim 1 wherein the outer surface of the elongate member is non-cylindrical and includes the step of forming said outer surface into a substantially cylindrical form suitable for use as the shell of the coupling member.

12. The method of claim 1 wherein the frusto-conical first portion is formed during the process of securing said first end to the coupling member.

13. The method of claim 1 wherein the barbs on the inner wall of the intermediate portion have a substantially pyramidal shape.

14. The method of claim 1, wherein the barbs on the inner wall of the intermediate portion have a substantially conical shape.

* * * * *